(12) United States Patent
Rosing et al.

(10) Patent No.: US 7,888,451 B2
(45) Date of Patent: Feb. 15, 2011

(54) METHODS FOR PREPARING SELECTIVELY-RELEASABLE ADHESIVES

(75) Inventors: Howard S. Rosing, Naples, FL (US); Yadong Wang, Allison Park, PA (US)

(73) Assignees: Global Biomedical Technologies, LLC, Naples, FL (US); Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 12/466,867

(22) Filed: May 15, 2009

(65) Prior Publication Data

US 2010/0010191 A1 Jan. 14, 2010

Related U.S. Application Data

(62) Division of application No. 12/171,739, filed on Jul. 11, 2008, now Pat. No. 7,745,562.

(51) Int. Cl.
*C08G 63/02* (2006.01)
(52) U.S. Cl. ........................ 528/272; 528/271; 528/300; 528/303; 528/480; 528/503; 428/343; 428/346; 428/355 R; 428/355 RA; 424/443; 424/444; 424/445; 424/446

(58) Field of Classification Search ................ 428/40.1, 428/40.3, 41.9, 42.3, 343, 354, 346, 355 R, 428/355 RA; 424/422, 424, 426, 443, 447, 424/449, 448; 528/271, 272, 302, 303, 480, 528/503
See application file for complete search history.

(56) References Cited

U.S. PATENT DOCUMENTS 4,382,137 A * 5/1983 Schulz et al. ................ 527/500
2003/0118692 A1* 6/2003 Wang et al. .................... 426/6

OTHER PUBLICATIONS

PCT notification of tranmittal of the International Search Report dated Oct. 3, 2008.
PCT notification of transmittal of the International Search Report dated Jan. 26, 2010.

* cited by examiner

*Primary Examiner*—Ling-Siu Choi
*Assistant Examiner*—Frances Tischler
(74) *Attorney, Agent, or Firm*—Thomas, Kayden, Horstemeyer & Risley, LLP

(57) ABSTRACT

In one embodiment, a method for preparing a selectively releasable adhesive includes condensing a multifunctional alcohol and a multifunctional carboxylic acid to form a prepolymer and curing the prepolymer at an elevated temperature and a vacuum to produce a cured polymer.

20 Claims, 6 Drawing Sheets

METHODS FOR PREPARING SELECTIVELY-RELEASABLE ADHESIVES

CROSS-REFERENCE TO RELATED APPLICATION

This application claims priority to copending U.S. non-provisional application entitled "Selectively-Releasable Adhesives" having Ser. No. 12/171,739, filed Jul. 11, 2008, which is entirely incorporated herein by reference.

BACKGROUND

Adhesives are used in many applications, including consumer, industrial, and medical applications. Although some adhesives are intended to form a permanent or semi-permanent bond with the items to which they are applied, many adhesives are used in less permanent applications. The latter type of adhesives are often used in applications in which an article is to be affixed to something else and later removed. An example is the common adhesive bandage strip, which is intended to stick to the skin until the wearer wishes to remove the bandage strip.

A problem with the adhesives that are used in temporary applications is that the adhesive may still adhere well to an object to which it has been applied when the time for removal has arrived. For example, in the case of an adhesive bandage strip, such adhesion can make it more difficult to remove the bandage strip and therefore may cause discomfort to the wearer. Although such discomfort may be relatively mild, the discomfort from removal of other types of bandages can be much greater. For example, removal of medical tape that secures dressings to the skin of a burn patient can not only cause the patient a great deal of pain, but further cause tissue damage.

BRIEF DESCRIPTION OF THE DRAWINGS

The disclosed adhesives can be better understood with reference to the following drawings. The components in the drawings are not necessarily to scale.

DETAILED DESCRIPTION

As described above, it can be difficult to remove articles that have been affixed to an object using conventional adhesives. Moreover, in cases in which the article is a bandage and the object is a patient, pain and/or tissue damage can occur from such removal. Described in the following are adhesives that lose much of their adhesive strength when a solvent is applied. Therefore, such adhesives can be used in applications in which selective release of the adhesive or an article to which the adhesive is applied is desired. In some embodiments, the adhesive comprises poly(glycerol-sebacate) and the solvent comprises an alcohol. Example applications for the adhesives include use in glues and adhesive tapes or bandages.

In the following, various embodiments of adhesives and articles that incorporate adhesives are described. Although specific embodiments are presented, those embodiments are mere exemplary implementations and, therefore, other embodiments are possible. All such embodiments are intended to fall within the scope of this disclosure.

Adhesive Compound Synthesis and Characteristics

Figure 1:
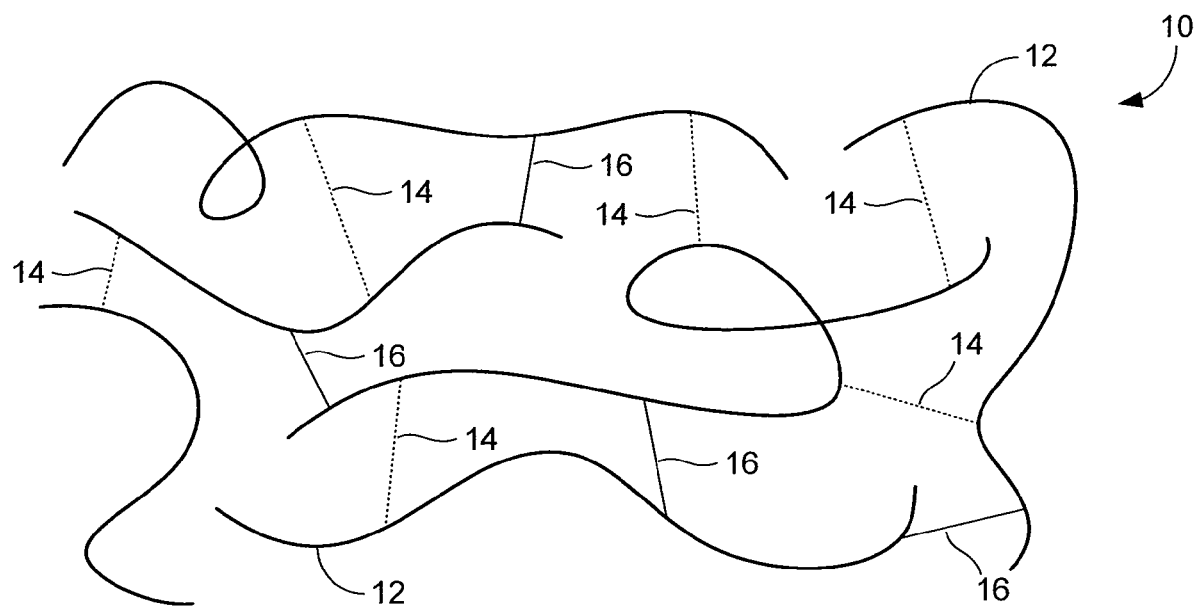
FIG. 1 is a schematic illustration of the chemical structure of a selectively-releasable adhesive.

Referring now to the figures, in which like reference numerals identify corresponding features, FIG. 1 schematically illustrates an adhesive compound or polymer 10, referred to herein simply as "adhesive." As indicated in that figure, the adhesive 10 includes a polymer backbone 12 and a plurality of chemical bonds including hydrogen bonds 14 and covalent bonds 16. As is apparent from FIG. 1, there are a relatively large number of hydrogen bonds 14 as compared to covalent bonds 16.

In some embodiments, the adhesive 10 comprises a copolymer formed from a multifunctional alcohol and a multifunctional carboxylic acid. As used herein, the term "multifunctional alcohol" refers to any alcohol that has two or more hydroxyl (—OH) groups, and the term "multifunctional carboxylic acid" refers to any carboxylic acid that has two or more acid (—COOH) groups. Example multifunctional alcohols include glycerol, monomeric carbohydrates such as glucose and mannose, and small polyols such as oligo (vinyl alcohol). Example multifunctional carboxylic acids include diacids such as sebacic acid, succinic acid, oxylic acid, and malic acid, and triacids such as citric acid. One example of such a copolymer is poly(glycerol-sebacate) or "PGS." An example of synthesis of PGS is described in the following several paragraphs.

The sebacic acid used to prepare the PGS can be rigorously purified prior to synthesis of the PGS to improve the quality of the resultant polymer. Such purification can be performed by combining a relatively small amount of sebacic acid with a relatively large amount of ethanol and heating the mixture until the sebacic acid completely dissolves. Once the sebacic acid has dissolved, the hot sebacic acid solution can be filtered under a vacuum and the filtrate can be refrigerated for several hours to enable crystallization. The sebacic acid crystals are then collected and intermittently filtered under vacuum to collect the crystals. After the completion of the filtration, the above process (dissolution, crystallization, and filtration) can be repeated multiple times (e.g., 3-4 times) to ensure a high level of purification. Thereafter, the air-dried sebacic acid crystals can be heated under a vacuum to remove any residual ethanol or moisture.

Once the sebacic acid has been purified, it can be used to synthesize PGS. Such synthesis can be accomplished through melt polycondensation of an approximately 0.5:1.0 to 1.5:1.0 molar ratio of glycerol to purified sebacic acid at an elevated temperature, such as approximately 120° C. In some embodiments, an equimolar amount (i.e., a 1.0:1.0 ratio) of glycerol and sebacic acid may be used. The reaction can, for example, be carried out under nitrogen gas ($N_2$) flow. The mixture can be stirred and water distilled from the reaction can be trapped and removed. The compound that results is a prepolymer of glycerol and sebacic acid, i.e., PGS prepolymer. As used herein, the term "prepolymer" describes the polymer prior to curing. Accordingly, the prepolymer exhibits no crosslinking.

Figure 2:
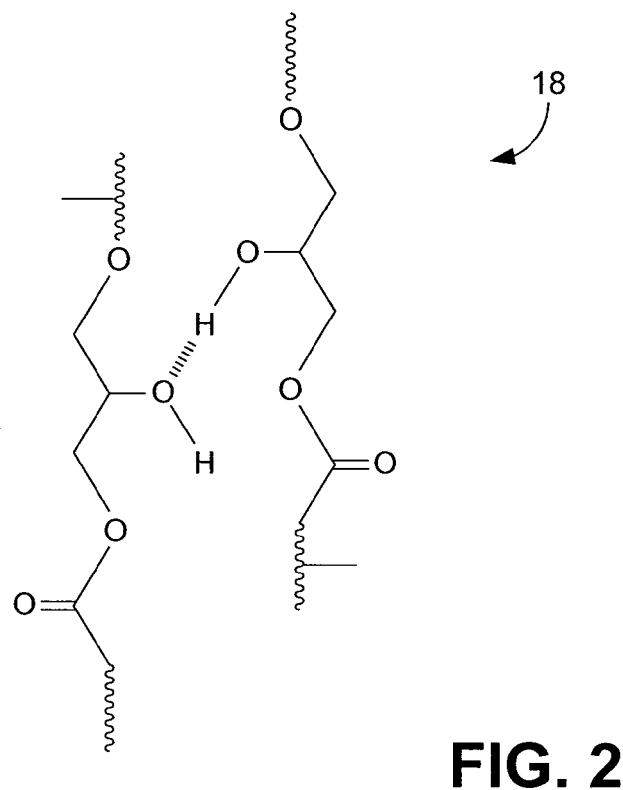
FIG. 2 is a diagram that illustrates an example chemical structure for an embodiment of the adhesive of FIG. 1.

After the PGS prepolymer has been synthesized, it can be transformed into the PGS polymer using a curing process. In some embodiments, the prepolymer is first mixed with solvent to form a solution that can be sprayed on a suitable non-stick substrate. Once the solvent evaporates, a film of PGS prepolymer remains on the substrate that can be cured in an oven over a period of several hours. FIG. 2 illustrates the chemical structure of an embodiment of a resultant PGS polymer 18, and the hydrogen bonding that occurs between chains of the polymer.

Figure 3:
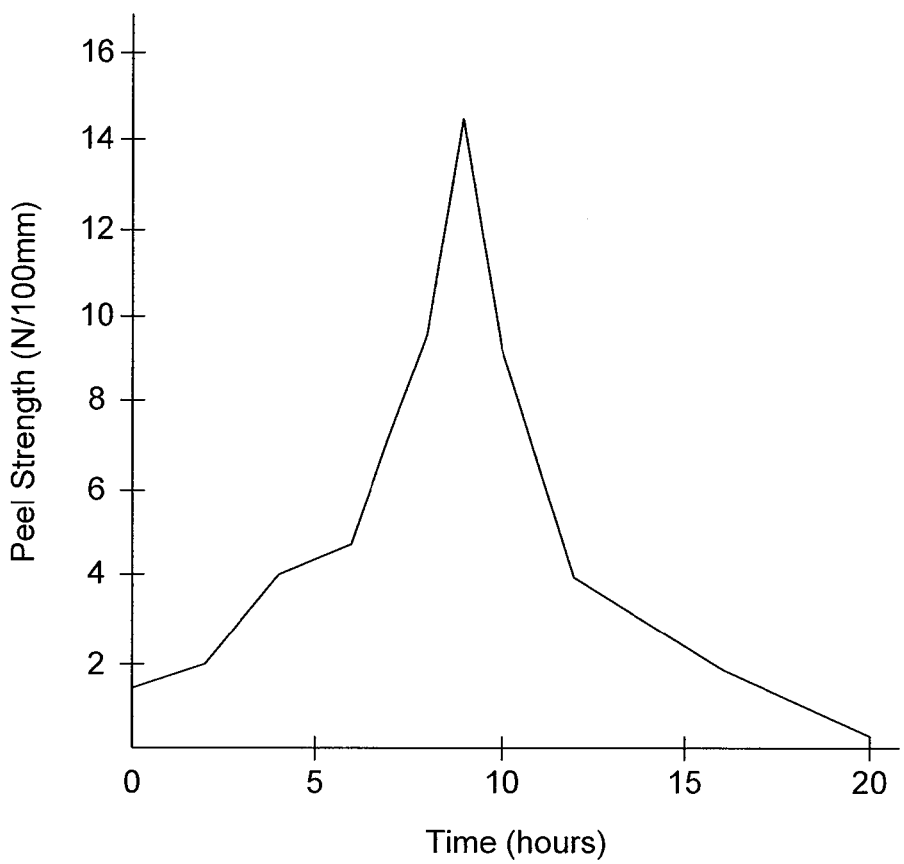
FIG. 3 is a graph that plots peel strength of PGS tape as a function of cure time.

The duration of time over which the prepolymer is cured (i.e., the cure time) directly affects the physical characteristics of the resultant polymer, including its adhesive strength. This is apparent from the graph of FIG. 3. As indicated in that graph, maximum adhesive strength was achieved for a preparation of PGS synthesized in the manner described above after approximately 9 hours of curing at approximately 120° C. and 100 milliTorr (mTorr). Specifically, testing of PGS adhesive tape (i.e., a substrate comprising a layer PGS) in accordance with ASTM D3330-78 PSTC-1 (using a reduced peel speed of 3.8 millimeters per second (mm/s)) revealed that the greatest peel strength occurred when the PGS adhesive was cured for approximately 9 hours at approximately 120° C. and 100 mTorr.

Unexpectedly, the strength of the adhesive, as exhibited by the peel strength, increases as the adhesive is cured, at least until the 9 hour mark, suggesting that the strongest adhesive is obtained when some, but relatively little, crosslinking occurs. This may be due to the fact that crosslinking increases the cohesiveness of the adhesive, which reduces separation of the adhesive from itself and, to a point, increases adhesive strength. In view of this, a cure time at or near 9 hours at a temperature of approximately 120° C. and a pressure of approximately 100 mTorr may be preferable for some applications. Notably, that cure time is significantly smaller and that vacuum is significantly weaker than that used to form other PGS polymers, such as the "bio-rubber" disclosed in U.S. Patent Publication Number 2003/0118692 of Wang et al. In that patent application, a non-adhesive elastomer is described as being formed by curing a PGS prepolymer for 48 hours at 40 mTorr and 120° C.

In addition to affecting adhesive strength, the shorter curing time and weaker vacuum also affect the chemical structure of the resulting polymer. For example, when the PGS prepolymer is cured for a relatively short period of time, such 20 hours or less, the resulting PGS polymer has a relatively large number of hydrogen bonds, which are particularly beneficial to obtaining good adhesion of human skin. Furthermore, as mentioned above, cure time affects the degree of crosslinking that results.

The crosslink density of PGS polymer was quantified using two different approaches. In a first "equilibrium swelling" approach, PGS samples were mixed with tetrahydofuran (THF). The samples were placed into sealed vials to minimize solvent evaporation. Each day, the excess THF on the surfaces of the samples was removed and the samples were weighed to gauge the extent of the swelling until no significant weight increase was observed, typically after about 3 days. At the end of that time period, the samples were blotted using filter paper and again weighed to determine for each sample the mass of the swollen network at equilibrium, $m_{eq}$. The samples were then dried in a vacuum oven at 25° C. for 1 week to determine the mass of the dried network after extraction of the solvent, $m_d$. Swelling was then calculated as a swelling percentage using the following relation:

$$\frac{m_{eq} - m_d}{m_d} \qquad \text{[Equation 1]}$$

The crosslink density was then calculated using the Flory-Rehner expression for tetra-functional affine network as expressed by:

$$\upsilon = \frac{\ln(1 - \upsilon_2) + \upsilon 2 + \chi \upsilon_2^2}{\upsilon_1((\upsilon_2/2) - \upsilon_2^{1/3})} \qquad \text{[Equation 2]}$$

and $$\upsilon_2 = \left[1 + \left(\frac{m_{eq} - m_d}{m_d}\right)\left(\frac{\rho_2}{\rho_1}\right)\right]^{-1} \qquad \text{[Equation 3]}$$

where $\upsilon$ is the strand density, $\upsilon_1$ is the molar volume of the solvent, $\upsilon_2$ is the volume fraction of the polymer at equilibrium swelling, $\chi$ is the polymer-solvent interaction parameter (i.e., the Flory-Huggins parameter, $\chi=0.42$), $\rho_1$ is the density of the polymer (i.e., 1.15 g/cm$^3$), and $\rho_2$ is the density of the solvent (i.e., 0.889 g/cm$^3$). Assuming an ideal tetra-functional network, the crosslink density, n, is half the strand density, $\upsilon$.

Using the above approach, the crosslink densities of the samples after 7, 9, and 16 hours were respectively determined. The results of those determinations are provided in Table 1.

TABLE 1

| Cure Time (h) | Swelling Percentage | $\upsilon_2$ | $\upsilon_1$ (mol/L) | $\upsilon$ (mol/L) | n (mol/L) | n (mol/L) (mean ± std) |
|---|---|---|---|---|---|---|
| 7 | (6.1404-0.5013)/ 0.5013 = 11.25 | 0.103 | 0.0811 | 0.037 | 0.018 | |
| 7 | (5.6754-0.4152)/ 0.4152 = 12.67 | 0.093 | 0.0811 | 0.030 | 0.015 | |
| 7 | (6.2596-0.4352)/ 0.4352 = 13.38 | 0.088 | 0.0811 | 0.027 | 0.014 | 0.0157 ± 0.21% |
| 9 | (5.4115-0.4608)/ | 0.108 | 0.0811 | 0.041 | 0.021 | |

TABLE 1-continued

| Cure Time (h) | Swelling Percentage | $v_2$ | $v_1$ (mol/L) | $v$ (mol/L) | n (mol/L) | n (mol/L) (mean ± std) |
|---|---|---|---|---|---|---|
| 9 | 0.4608 = 10.74 (4.538-0.3879)/ 0.3879 = 10.69 | 0.108 | 0.0811 | 0.041 | 0.021 | |
| 9 | (6.1-0.5424)/ 0.5424 = 10.25 | 0.112 | 0.0811 | 0.044 | 0.022 | 0.0213 ± 0.01% |
| 16 | (5.5778-0.6226)/ 0.6226 = 7.96 | 0.140 | 0.0811 | 0.071 | 0.036 | |
| 16 | (5.0197-0.5471)/ 0.5471 = 8.18 | 0.137 | 0.0811 | 0.068 | 0.032 | |
| 16 | (6.3256-0.6786)/ 0.6786 = 8.32 | 0.135 | 0.0811 | 0.066 | 0.033 | 0.0337 ± 0.21% |

In a second approach, crosslink density was derived from Young's modulus measured during mechanical testing. In this approach, samples of PGS were immersed in water to identify their volumes and briefly reduce their tackiness. The samples were then individually reshaped into solid cylinders and mounted between glass cover slips and mounted between the compression platens on a Synergies 100 mechanical tester equipped with a 50 Newton (N) load cell. Tests were performed according to ASTM D695 with a pre-load force of 0.1 N, a pre-load speed of 1 millimeter per minute (mm/min), a strain endpoint of 0.4 mm/min, and a test speed of 1 mm/min. The cross-sectional area was calculated for each sample by dividing the sample volume by the specimen height as determined by the crosshead distance minus the thickness of the two glass cover slips. The molecular mass between the crosslinks, $M_c$, was then calculated using the following equation:

$$M_c = \frac{E_o}{3RT \cdot \rho} \quad \text{[Equation 4]}$$

where $E_o$ is the Young's modulus of the sample as determined from the mechanical testing, R is the universal gas constant, T is the temperature in Kelvin, and $\rho$ is the density of the sample. The crosslink density derived from modulus, $n_E$, for each of the samples was then determined using the following equation:

$$n_E = \frac{\left(\frac{M_w}{M_c} - 1\right)}{\left(\frac{M_w}{M_r} - 1\right)} \quad \text{[Equation 5]}$$

where $M_w$ is the molecular weight of the PGS prepolymer as measured using gel permeation chromatography and $M_r$ is the molecular mass of the repeating unit as determined by the known characteristics of the constituents of the material (i.e., glycerol and sebacic acid).

Using the second approach, the crosslink density percentages after 7, 9, 16, and 20 hours were respectively determined. The results of those determinations are provided in Table 2.

TABLE 2

| Cure Time (h) | $n_E$ (%) |
|---|---|
| 7 | 0 |
| 9 | 1.24 |
| 16 | 2.76 |
| 20 | 7.00 |

In view of the above, PGS adhesives having desirable adhesive strength can be obtained by curing the polymer for up to approximately 20 hours at approximately 120° C. and 100 mTorr. As is apparent from FIG. 3, cure times in the range of approximately 6 to 12 hours yield polymers having the greatest adhesive strength, with the maximum adhesive strength being exhibited for cure times of approximately 8 to 10 hours (e.g., 9 hours). Adhesives cured within those ranges of time may possess crosslink densities of approximately 0 to 0.5 moles per liter (mol/L) and/or approximately 0 to 4 percent. Maximum adhesive strength may be achieved with adhesives having crosslink densities of approximately 0.01 to 0.04 mol/L and/or approximately 1 to 3 percent. While particular cure times have been identified, it is noted that cure time is dependent upon other parameters, such as temperature, pressure, and sample size. Therefore, equivalent degrees of curing may be achieved in greater or lesser time depending upon those other parameters when curing is performed.

Figure 4:
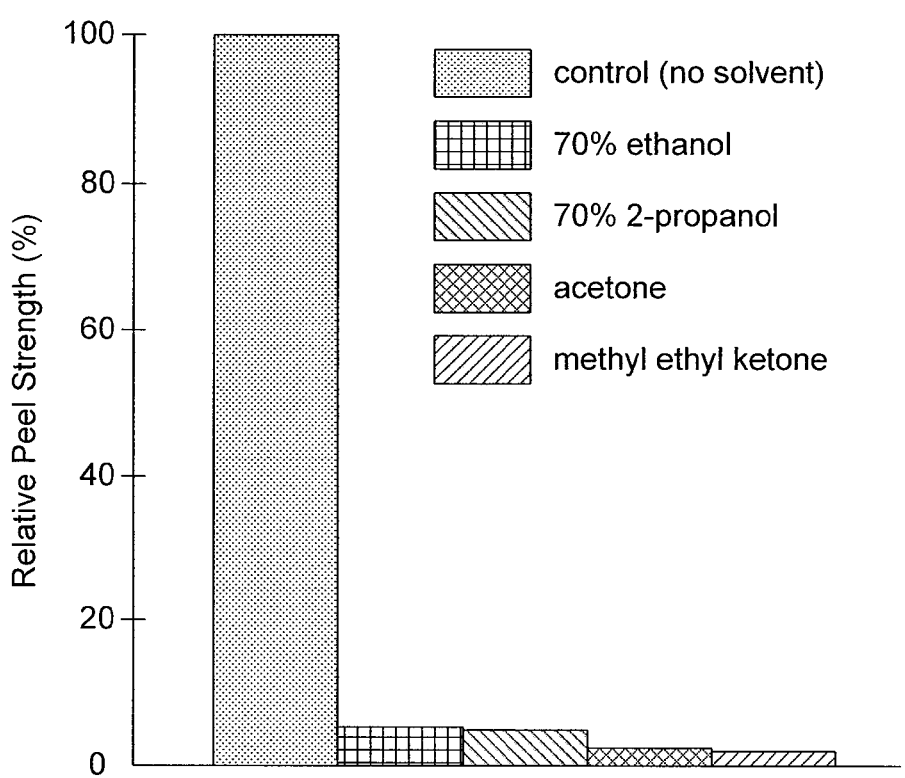
FIG. 4 is a graph that plots peel strength of PGS tape after application of various solvents.

As mentioned above, the adhesive strength of the disclosed adhesive can be selectively reduced through the application of a solvent. Suitable solvents include alcohols, such as ethanol, 1-propanol, 2-propanol, and 1-butanol; ketones, such as acetone, and methyl ethyl ketone; ethers, such as tetrahydrofuran and diethyl ether; amides, such as N,N-dimethyl foramide; sulfoxides, such as dimethyl sulfoxide; and esters, such as ethyl acetate. The effectiveness of ethanol, 2-propanol, acetone, and methyl ethyl ketone are exhibited in the graph of FIG. 4. The results from that graph were obtained using the same ASTM procedure identified above 10 seconds after the various solvents were sprayed onto PGS tape samples. As can be appreciated from FIG. 4, a 70/30 solution of ethanol and water and a 70/30 solution of 2-propanol and water both reduce the peel strength of PGS tape by more than 95%, while acetone and methyl ethyl ketone reduce the peel strength by more than 98%. Therefore, application of an appropriate solvent dramatically reduces the adhesiveness of the adhesive so that it possesses very little adhesive strength. Notably, the loss in adhesive strength occurs rapidly typically example within a few seconds. As a consequence of characteristics, the adhesive or an article to which the adhesive has been applied, such as medical tape or a bandage strip, can be removed with very little force, and therefore very little discomfort and/or tissue damage, once the solvent has been applied.

Figure 5A:
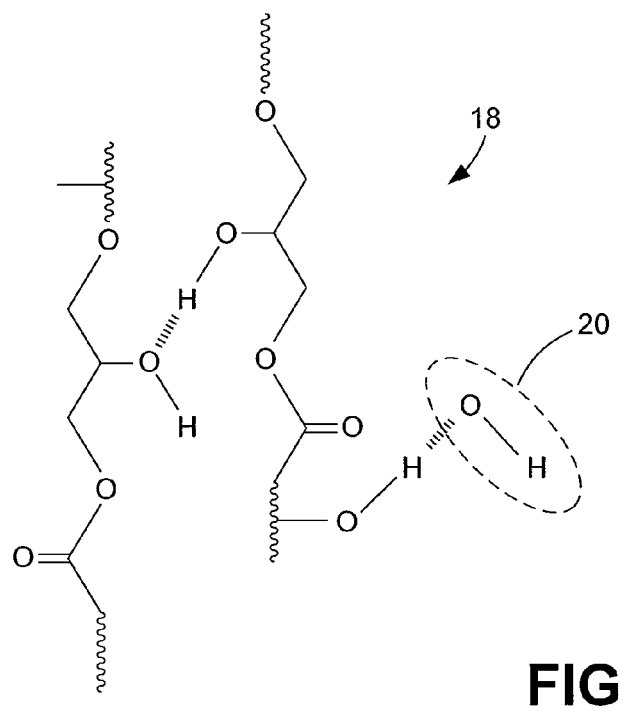
FIG. 5A is a diagram depicting adhesion between the adhesive of FIG. 2 and human skin.
Figure 5B:
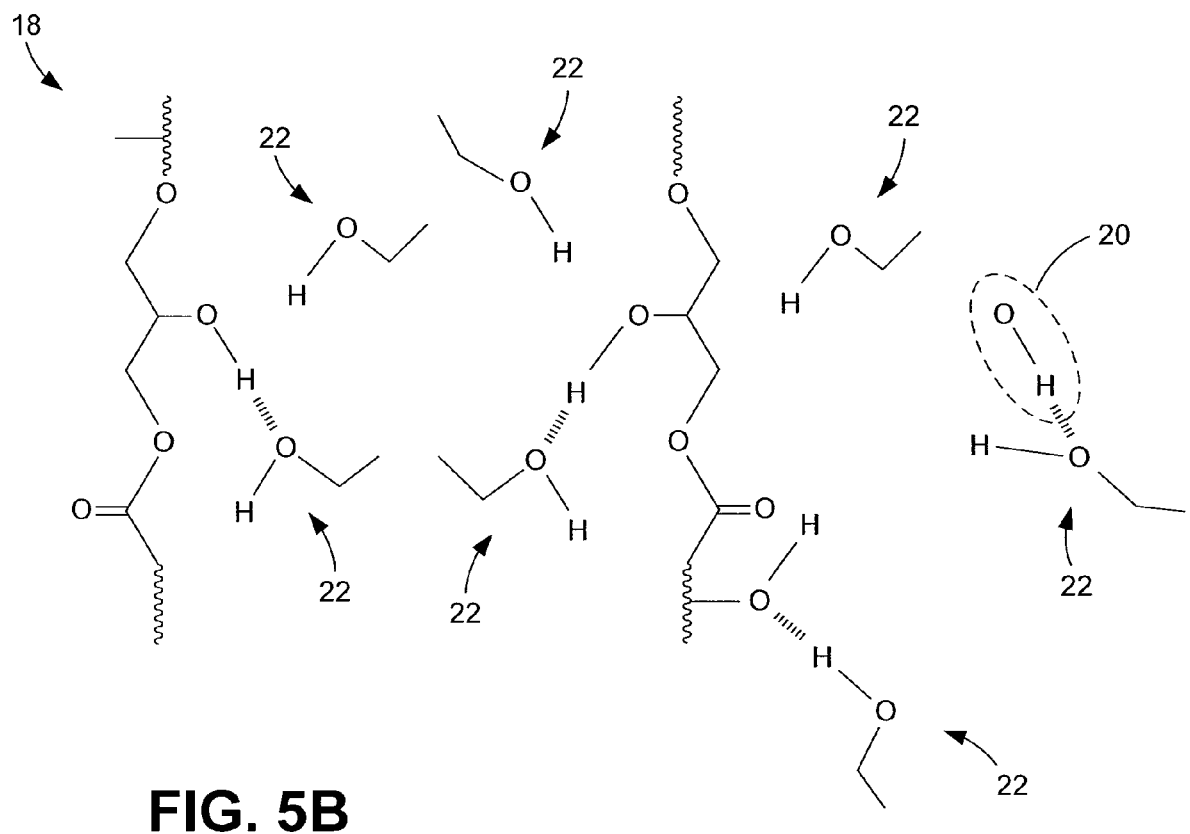
FIG. 5B is a diagram depicting reduced adhesion between the adhesive of FIG. 2 and human skin after the application of a solvent.

A mechanism with which release of the adhesive may be achieved is depicted in FIGS. 5A and 5B. FIG. 5A illustrates bonding of the adhesive 18 of FIG. 2 to skin 20 prior to application of a solvent. As indicated in FIG. 5A, hydrogen bonding interactions occur between the adhesive 18 and the skin 20. FIG. 5B illustrates the adhesive 18 and the skin 20 after the introduction of ethanol. As indicated in FIG. 5B, ethanol molecules 22 swell the adhesive 18 and form hydrogen bonds with both the adhesive and the skin 20, thereby interfering with bonding of the adhesive to the skin. In addition, the swelling of the adhesive 18 reduces the cohesiveness of the polymer and results in easier removal of the adhesive from the skin.

Figure 6:
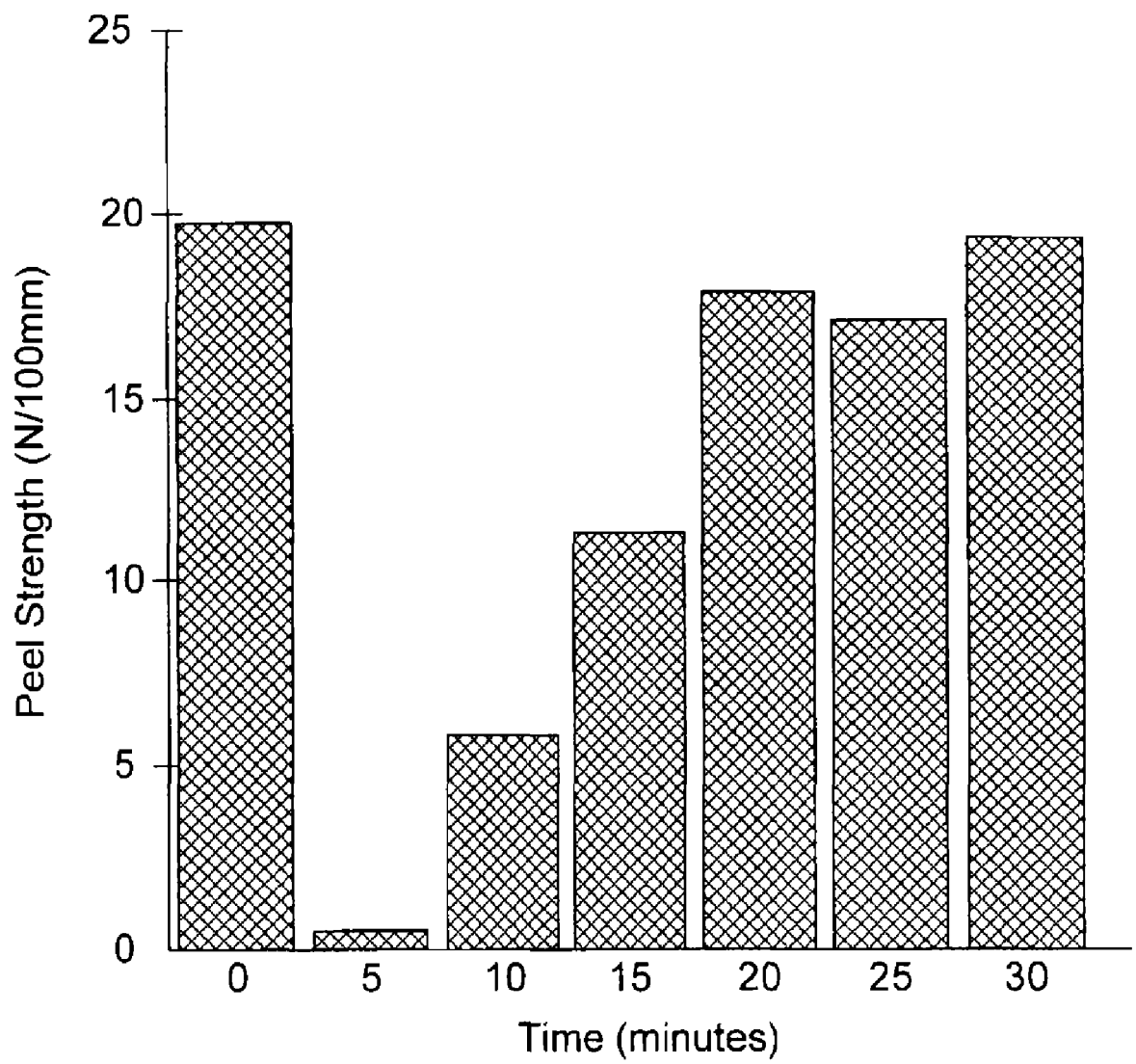
FIG. 6 is graph that plots peel strength of PGS tape both before and after application of an ethanol solution as a function of time.

In at least some embodiments, the adhesive strength of the selectively-releasable adhesive is recoverable. Specifically, the original adhesive strength of the adhesive returns after the applied solvent evaporates. Such results are shown in the graph of FIG. 6, which illustrates peel strength of PGS tape both before application of a 70% ethanol solution (i.e., time=0) and multiple times thereafter. As can be appreciated from FIG. 6, although peel strength is dramatically reduced 5 minutes after application of the ethanol solution, the peel strength nearly returns to initial levels after 30 minutes.

In some embodiments, the adhesiveness of the selectively-releasable adhesive naturally degrades over time while exposed to moisture. Such degradation can be avoided or reduced by either storing the adhesive in a moisture-free environment, such as in a vacuum or in a water-free gas. For example, testing has shown that when PGS tape is stored in a weak vacuum of approximately 12 Torr or stored in $N_2$, the tape exhibited no reduction in peel strength for at least 60 days. Therefore, it may be desirable to store articles to which the selectively-releasable adhesive is applied in sealed packages under vacuum and/or that contain an inert gas until the time of use. Once exposed, the adhesive maintains much of its adhesive strength for at least a week.

Example of Adhesive Synthesis

Samples of PGS adhesive were synthesized in a laboratory by adding 100 grams (g) of sebacic acid to a 2 L round bottom flask along with 1 L of 95/5 blend of ethanol and water. The flask was heated in a 55° C. water bath until the sebacic acid completely dissolved. Once the sebacic acid dissolved, the hot sebacic acid solution was filtered through a 0.45 micron (μm) nylon filter under a vacuum.

The filtrate was then transferred to a clean 2 L Erlenmeyer flask, allowed to cool to room temperature, and then stored at 4° C. overnight (approximately 8 hours) to enable crystallization. The next day, sebacic acid crystals were collected with a 0.22 μm filtration setup under a vacuum. The crystals were maintained under the vacuum and intermittently stirred for 3 to 4 days until the ethanol evaporated.

The above process was then repeated multiple times and the air-dried sebacic acid crystals were transferred to a 2 L glass beaker that was placed in a vacuum oven. A vacuum was applied until the oven reached a full vacuum of 90 to 100 mTorr, and then the oven was set to temperature to 60° C., which was arrived at in 1° C./min steps. The sebacic acid crystals were then maintained at 60° C. for a period of 16 hours.

Once the sebacic acid was purified in the manner described above, it was used to synthesize the PGS by melt polycondensation. Equimolar amounts of glycerol (34.45 g) and purified sebacic acid (75 g) were heated to approximately 120° C. in a 500 milliliter (ml) three-neck flask equipped with a Dean-Stark trap under $N_2$ flow. The mixture was stirred at atmospheric pressure with a 1¼ inch×⅝ inch, egg-shaped stir bar having a weight of 15.5 g at stir rate of approximately 500 revolutions per minute (rpm). Water was collected in the trap during the stirring. Once no more water collected in the trap, a vacuum was gradually applied over approximately one hour until the pressure stabilized at approximately 100 mTorr to 150 mTorr. The reaction was permitted to progress until the maximum stir rate was reduced to approximately 10 rpm (after approximately 72-90 hours). At that point, the mixture was a PGS prepolymer.

The PGS prepolymer was then was dissolved in THF to form a 30% PGS solution and the solution was sprayed onto wax paper. The THF was permitted to evaporate until only a film of PGS prepolymer remained. The film was covered with a piece of cloth, which was transferred to a vacuum oven. The cloth was then cured at 120° C. at 100 mTorr for 9 hours.

Example Applications

The selectively-releasable adhesive described in the foregoing can be used in various applications, including consumer, industrial, and medical applications. Described in the following are examples of such applications.

Figure 7:
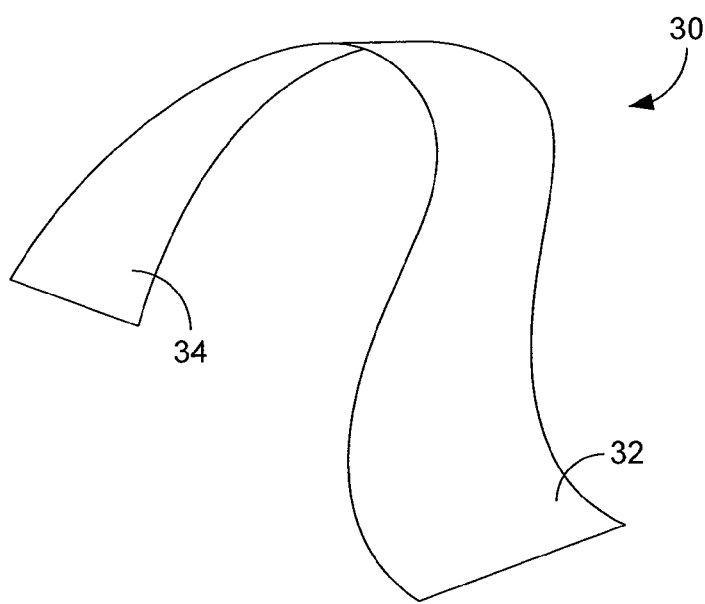
FIG. 7 is a perspective view of an embodiment of adhesive tape that incorporates a selectively-releasable adhesive.
Figure 8:
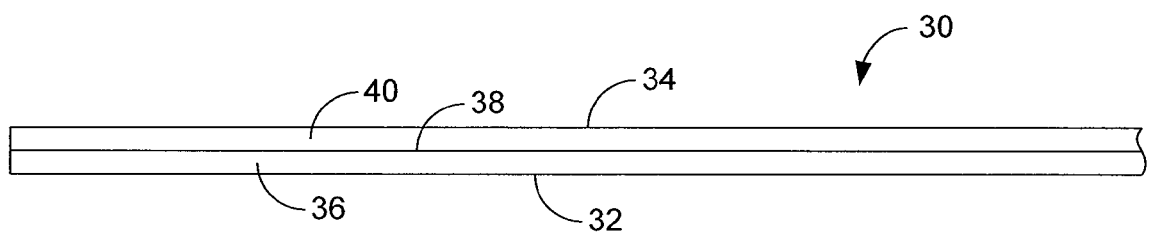
FIG. 8 is a side view of the adhesive tape of FIG. 7.

FIG. 7 illustrates an embodiment of adhesive tape 30 that incorporates the selectively-releasable adhesive. By way of example, the tape 30 can be used in medical applications to secure bandages or other articles to a patient and therefore adheres to the patient's skin. The tape 30 generally comprises a continuous, thin, and flexible strip having an outer side 32 and an inner side 34. FIG. 8 illustrates an example construction that can be used to form the tape 30. In the embodiment of FIG. 8, the tape 30 includes a substrate 36 having an inner surface 38 to which has been applied an adhesive layer 40 that comprises the above-described selectively-releasable adhesive. In some embodiments, the substrate 36 comprises a flexible material that is adapted to conform to the contours of subjects to which the tape 30 is applied. Example constructions for the substrate 36 include layers of paper, textiles, polymers, foam, and foil. Irrespective of the material used, the substrate 36 preferably is porous so that a solvent applied to the exterior of the tape 30 can reach the adhesive layer 40 to facilitate release. By way of example, the adhesive layer 40 is approximately 10 to 200 μm thick.

Figure 9:
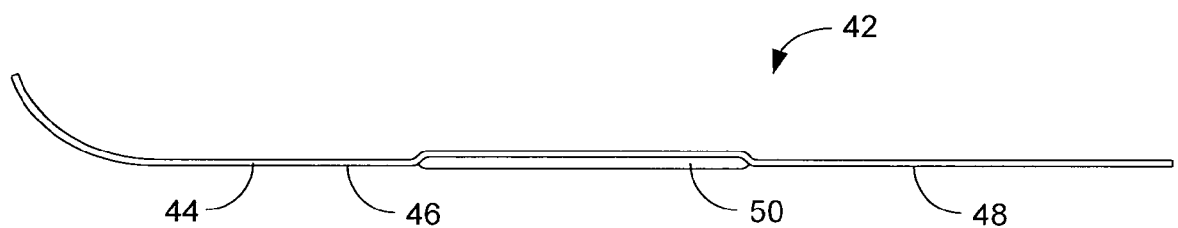
FIG. 9 is a side view of an embodiment of an adhesive bandage strip that incorporates a selectively-releasable adhesive.

FIG. 9 illustrates an adhesive bandage strip 42 that incorporates the selectively-releasable adhesive. As indicated in FIG. 9, the bandage strip 42 includes a substrate 44 having an inner surface 46 to which has been applied an adhesive layer 48 that comprises the above-described selectively-releasable adhesive. As with the substrate 36, the substrate 44 can comprise a flexible material that is adapted to conform to the contours of subjects to which the bandage strip 42 is applied. Example constructions for the substrate 44 include layers of paper, textile, polymers, foam, and foil. Irrespective of the material used, the substrate 44 is preferably porous so that a solvent applied to the exterior of the bandage strip 42 can reach the adhesive layer 48 to facilitate release. By way of example, the adhesive layer 48 is approximately 10 to 200 μm thick. As is further indicated in FIG. 9, the bandage strip 42 includes a central dressing element 50 designed to overlie a cut or other wound.

Figure 10:
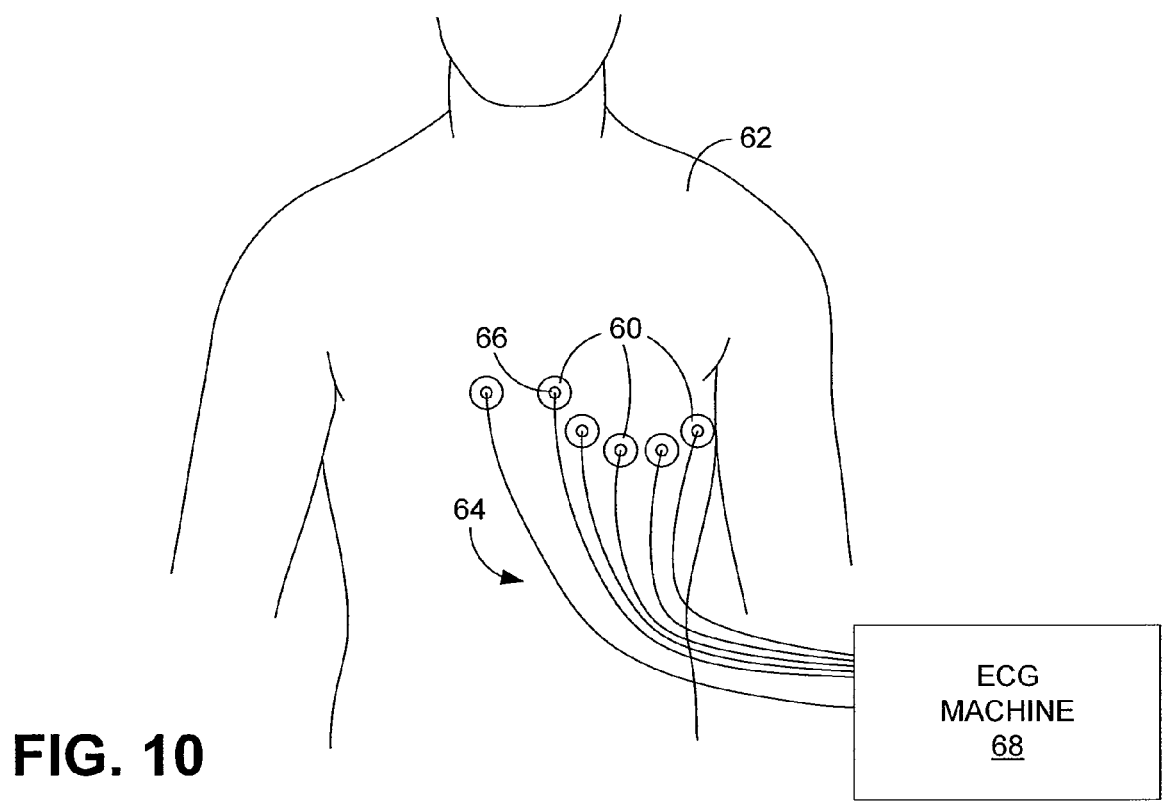
FIG. 10 is a front view of a patient to which adhesive ECG leads that incorporate a selectively-releasable adhesive have been applied.
Figure 11:
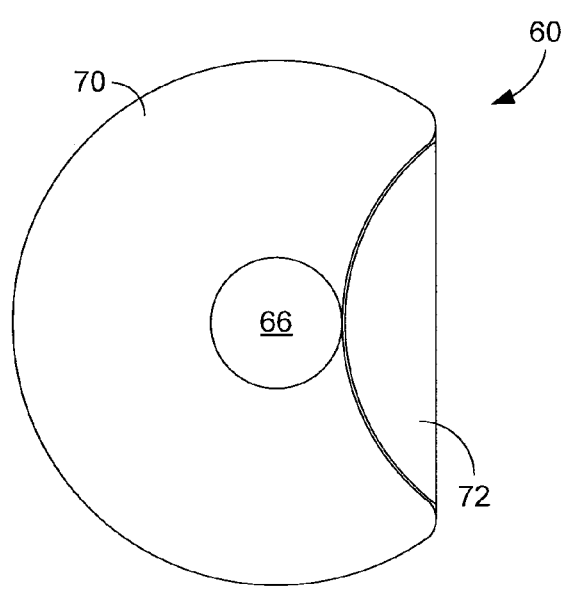
FIG. 11 is a top view of an embodiment of an ECG lead shown in FIG. 10.

There are various other applications for the selectively-releasable adhesive beyond adhesive tape and bandages. FIG. 10 illustrates one example of such an application. Specifically, illustrated in FIG. 10 are multiple adhesive electrocardiogram (ECG) leads 60 that have been applied to a patient 62. As indicated in the figure, wires 64 extend from electrodes 66 provided on the leads 60 to an ECG machine 68. FIG. 11 illustrates an example configuration for one of the ECG leads 60. As indicated in FIG. 11, the ECG lead 60 comprise a substrate 70 to which is applied an adhesive layer 72 that comprises the selectively-releasable adhesive.

As stated above, the present disclosure describes various embodiments of adhesives and articles that incorporate an adhesive. It is reiterated that those embodiments are mere exemplary implementations. Accordingly, although PGS adhesive has been described in detail, adhesives consistent with this disclosure may be composed of other materials.

The invention claimed is:

1. A method for preparing a selectively releasable adhesive, the method comprising:
   condensing a multifunctional alcohol and a multifunctional carboxylic acid to form a prepolymer; and
   curing the prepolymer at an elevated temperature and a vacuum for a time period not exceeding 20 hours to produce a cured polymer adhesive that has inherent adhesive strength and therefore adheres to objects to which it is applied.

2. The method of claim 1, wherein condensing comprises condensing glycerol and a diacid.

3. The method of claim 1, wherein condensing comprises condensing glycerol and sebacic acid.

4. The method of claim 1, wherein condensing comprises condensing an approximately 0.5:1.0 to 1.5:1.0 molar ratio of glycerol and sebacic acid.

5. The method of claim 1, wherein condensing comprises condensing an approximately equimolar ratio of glycerol and sebacic acid.

6. The method of claim 1, wherein curing comprises curing the prepolymer at approximately 120° C. and 100 milliTorr.

7. The method of claim 1, wherein curing comprises curing the prepolymer the equivalent of approximately 8 to 10 hours at approximately 120° C. and 100 milliTorr.

8. The method of claim 1, wherein curing comprises curing the prepolymer the equivalent of approximately 9 hours at approximately 120° C. and 100 milliTorr.

9. The method of claim 1, further comprising purifying the multifunctional carboxylic acid prior to combining it with the multifunctional alcohol.

10. The method of claim 9, wherein purifying comprises repeatedly dissolving and filtering the multifunctional carboxylic acid.

11. A method for preparing a selectively releasable adhesive, the method comprising:
   condensing a multifunctional alcohol and a multifunctional carboxylic acid to form a prepolymer; and
   curing the prepolymer at an elevated temperature and a vacuum to produce a cured polymer adhesive that has inherent adhesive strength and therefore adheres to objects to which it is applied.

12. The method of claim 11, wherein condensing comprises condensing glycerol and sebacic acid.

13. The method of claim 11, wherein condensing comprises condensing an approximately 0.5:1.0 to 1.5:1.0 molar ratio of glycerol and sebacic acid.

14. The method of claim 11, wherein condensing comprises condensing an approximately equimolar ratio of glycerol and sebacic acid.

15. The method of claim 11, wherein curing comprises curing the prepolymer at approximately 120° C. and 100 milliTorr.

16. The method of claim 11, wherein curing comprises curing the prepolymer the equivalent of less than 20 hours at approximately 120° C. and 100 milliTorr.

17. The method of claim 11, wherein curing comprises curing the prepolymer the equivalent of approximately 8 to 10 hours at approximately 120° C. and 100 milliTorr.

18. The method of claim 11, wherein curing comprises curing the prepolymer the equivalent of approximately 9 hours at approximately 120° C. and 100 milliTorr.

19. The method of claim 11, further comprising purifying the multifunctional carboxylic acid prior to combining it with the multifunctional alcohol.

20. The method of claim 19, wherein purifying comprises repeatedly dissolving and filtering the multifunctional carboxylic acid.

* * * * *